United States Patent
Namba

(10) Patent No.: US 11,508,978 B2
(45) Date of Patent: Nov. 22, 2022

(54) FUEL CELL SYSTEM

(71) Applicant: TOYOTA JIDOSHA KABUSHIKI KAISHA, Toyota (JP)

(72) Inventor: Ryouichi Namba, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 73 days.

(21) Appl. No.: 17/164,917

(22) Filed: Feb. 2, 2021

(65) Prior Publication Data

US 2021/0257636 A1 Aug. 19, 2021

(30) Foreign Application Priority Data

Feb. 19, 2020 (JP) ............................. JP2020-026058

(51) Int. Cl.
| | |
|---|---|
| *H01M 8/04701* | (2016.01) |
| *H01M 8/04029* | (2016.01) |
| *H01M 8/04007* | (2016.01) |
| *H01M 8/04223* | (2016.01) |
| *H01M 8/0432* | (2016.01) |
| *H01M 8/04302* | (2016.01) |
| *H01M 8/04746* | (2016.01) |

(52) U.S. Cl.
CPC ... *H01M 8/04701* (2013.01); *H01M 8/04029* (2013.01); *H01M 8/0432* (2013.01); *H01M 8/04067* (2013.01); *H01M 8/04253* (2013.01); *H01M 8/04268* (2013.01); *H01M 8/04302* (2016.02); *H01M 8/04768* (2013.01)

(58) Field of Classification Search
None
See application file for complete search history.

(56) References Cited

U.S. PATENT DOCUMENTS

| | | | |
|---|---|---|---|
| 2006/0280976 A1* | 12/2006 | Hashigaya | H01M 8/2457 429/513 |
| 2012/0015272 A1 | 1/2012 | Naganuma et al. | |
| 2017/0214069 A1* | 7/2017 | Hoshi | H01M 8/04067 |
| 2020/0185733 A1* | 6/2020 | Ryu | H01M 8/04074 |

FOREIGN PATENT DOCUMENTS

| | | |
|---|---|---|
| JP | 2010277704 A | 12/2010 |
| JP | 5636905 B2 | 12/2014 |

* cited by examiner

*Primary Examiner* — Jonathan Crepeau
(74) *Attorney, Agent, or Firm* — Dickinson Wright, PLLC

(57) ABSTRACT

A fuel cell system includes a fuel cell stack, an oxidizing gas supply system, a cooling medium circulation pump, a stack temperature acquisition unit, and a control unit. After a first time point when a change in an acquisition temperature turns from downward to upward after the change in the acquisition temperature turns from upward to downward for the first time after the start of the warm-up operation processing, the control unit sets a decrease speed in cases of decreasing a rotational speed of the cooling medium circulation pump to a smaller value than a value set before the first time point.

3 Claims, 8 Drawing Sheets

Fig.5

| COOLING MEDIUM TEMPERATURE [°C] | ROTATIONAL SPEED [rpm] | |
|---|---|---|
| ⋮ | ⋮ | RISING RATE: Ra1[sec] |
| −30 | A1 | |
| −29 | A2 | |
| ⋮ | ⋮ | |
| 0 | A31 | DROP RATE: Rb1[sec] |
| ⋮ | ⋮ | |
| 30 | A61 | |
| ⋮ | ⋮ | |

69

FUEL CELL SYSTEM

CROSS REFERENCE TO RELATED APPLICATIONS

The present application claims priority based on Japanese Patent Application No. 2020-026058 filed on Feb. 19, 2020, and the entire disclosure thereof is incorporated in the present application by reference.

BACKGROUND

Field

The present disclosure relates to the art of a fuel cell system.

Related Art

In the known art of a conventional fuel cell system, in cases when making a fuel cell generate power at a low temperature such as below freezing point, the fuel cell system drives a cooling medium circulation pump configured to circulate a cooling medium in the fuel cell according to the temperature increase speed of the fuel cell (Japanese Patent Application Laid-open Publication No. 2010-277704).

In general, when the temperature of the cooling medium is low, for example, −30° C. (Celsius), the cooling medium has high viscosity. In cases where a cooling medium circulation pump is driven to circulate such a cooling medium with high viscosity existing in a cooling medium circulation path, the cooling medium need not be mixed evenly, and may have increased temperature distribution in the cooling medium circulation path. In cases where a cooling medium with significant temperature distribution is circulated, the temperature increase speed of the fuel cell fluctuates frequently. This significantly changes the rotational speed of the cooling medium circulation pump, and thus significantly changes the flow rate of the cooling medium circulating in the cooling medium circulation path. As a result, the temperature of the fuel cell may drop significantly, and the water generated in the fuel cell may be frozen. If the water generated in the fuel cell is frozen, oxidizing gas is not smoothly supplied to a cathode, with the result that that pumping hydrogen may be generated due to the shortage of oxidizing gas. The pumping hydrogen is hydrogen generated at the cathode by the recombination of electrons and hydrogen ions conducted from an anode due to the shortage of oxygen at the cathode.

SUMMARY

The present disclosure in one aspect provides a fuel cell system. The fuel cell system includes a fuel cell stack, a cooling medium circulation path allowing a cooling medium to flow into the fuel cell stack, a cooling medium circulation pump disposed on the cooling medium circulation path and configured to regulate the circulation flow rate of the cooling medium, a stack temperature acquisition unit configured to acquire the temperature of the fuel cell stack, and a control unit configured to control operation of the cooling medium circulation pump by use of an acquisition temperature acquired by the stack temperature acquisition unit. The control unit executes warm-up operation processing of the fuel cell stack to raise the temperature of the fuel cell stack by use of heat generated by the fuel cell stack when a predetermined condition is satisfied. The control unit drives the cooling medium circulation pump according to the acquisition temperature in the warm-up operation processing. After a first time point when a change in the acquisition temperature turns from downward to upward after the change in the acquisition temperature turns from upward to downward for the first time after the start of the warm-up operation processing, the control unit sets a decrease speed in cases of decreasing the rotational speed of the cooling medium circulation pump to a smaller value than a value set before the first time point.

BRIEF DESCRIPTION OF THE DRAWINGS

FIG. 5 shows a diagram illustrating an operation map;

DETAILED DESCRIPTION

A. First Embodiment

Figure 1:
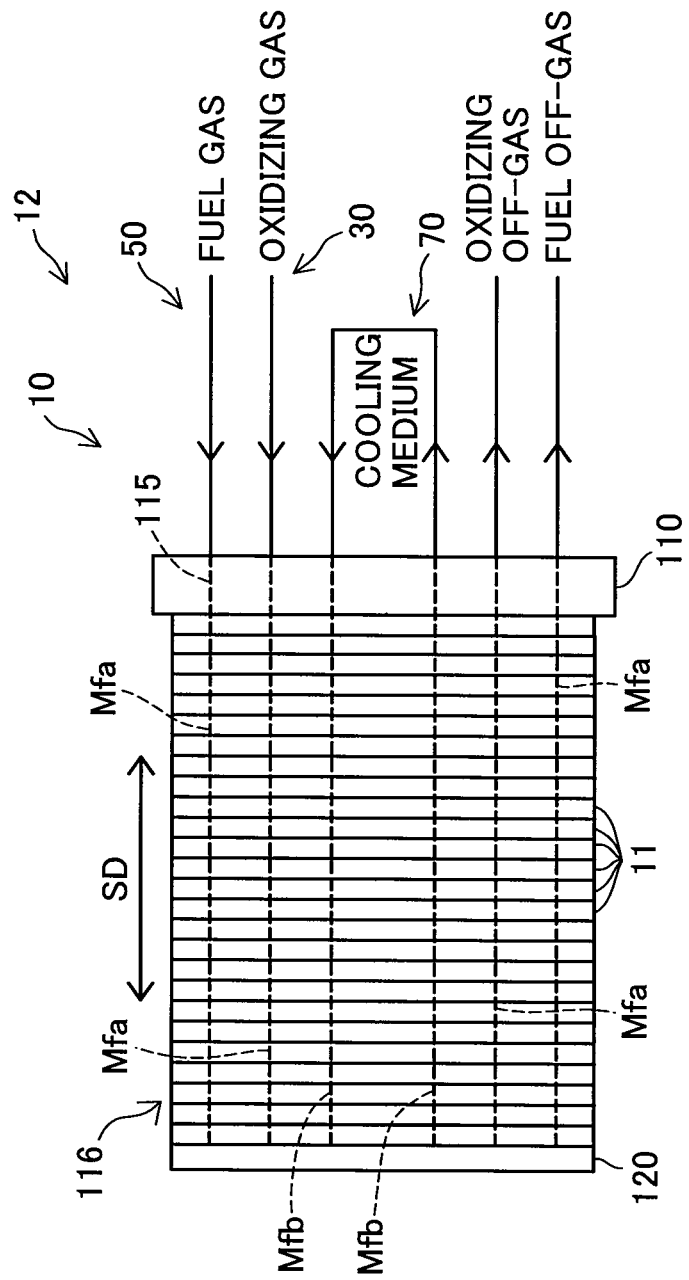
FIG. 1 shows a diagram illustrating a schematic configuration of a fuel cell system.

FIG. 1 shows a diagram illustrating the schematic configuration of a fuel cell system 10. The fuel cell system 10 is mounted on, for example, a fuel cell vehicle 12, and used as a power generation device configured to drive a drive motor for the fuel cell vehicle 12. The fuel cell system 10 includes a fuel cell stack 116, a fuel gas supply/discharge system 50, an oxidizing gas supply/discharge system 30, and a cooling medium circulation system 70.

The fuel cell stack 116 includes a plurality of fuel cells 11 and a pair of end terminals 110, 120. The plurality of fuel cells 11 respectively having plate-like shapes are stacked in a stacking direction SD, which is a thickness direction. The fuel cell 11 is a solid polymer type fuel cell which generates power by an electrochemical reaction of oxygen and hydrogen after being supplied with oxidizing gas and fuel gas as a reaction gas. In the present embodiment, the oxidizing gas is air containing oxygen, and the fuel gas is hydrogen. Each unit of the fuel cells 11 serves as a power generation element capable of generating power. The fuel cell 11 includes a membrane electrode assembly and two separators holding the membrane electrode assembly therebetween. The membrane electrode assembly has an electrolyte membrane, an anode disposed on one side surface of the electrolyte membrane, and a cathode disposed on the other side surface of the electrolyte membrane. Each of the fuel cells 11 has, on its outer peripheral end, an opening (not shown) forming a manifold Mfa for circulating reaction gas and the reaction off-gas which has passed through a power generation part. The manifold Mfa is branched and connected to power generation parts of the respective fuel cells 11. Each of the fuel cells 11 has, on its outer peripheral end, an opening (not shown) forming a manifold Mfb for circulating a cooling medium.

The pair of end terminals 110, 120 are disposed at both ends in the stacking direction SD of the plurality of fuel cells 11. Specifically, the first end terminal 110 is disposed at one end of the fuel cell stack 116, and the second end terminal 120 is disposed at the other end, which is the opposite side of the one end of the fuel cell stack 116. The first end terminal 110 has openings 115, which are the through holes for forming the manifold Mfa and the manifold Mfb. On the other hand, the second end terminal 120 has none of the openings 115 corresponding to the through holes for forming the manifold Mfa and the manifold Mfb. This means that the fuel gas, the oxidizing gas and the cooling medium are supplied to or discharged from only one side of the fuel cell stack 116 in the stacking direction SD.

The fuel gas supply/discharge system 50 has a fuel gas supply function, a fuel gas discharge function, and a fuel gas circulation function. The fuel gas supply function is executed to supply fuel gas to the anode of the fuel cell 11. The fuel gas discharge function is executed to discharge the fuel gas discharged from the anode of the fuel cell 11 (also referred to as "fuel off-gas"), to the outside. The fuel gas circulation function is executed to circulate fuel gas in the fuel cell system 10.

The oxidizing gas supply/discharge system 30 has an oxidizing gas supply function for supplying the oxidizing gas to the cathode of the fuel cell 11, an oxidizing gas discharge function for discharging the oxidizing gas discharged from the cathode of the fuel cell 11 (also referred to as "oxidizing off-gas") to the outside, and a bypass function for discharging the supplied oxidizing gas to the outside without passing through the fuel cell 11.

The cooling medium circulation system 70 regulates the temperature of the fuel cell stack 116 by circulating the cooling medium into the fuel cell stack 116. Examples of the cooling medium include antifreezes such as ethylene glycol and liquids such as water.

Figure 2:
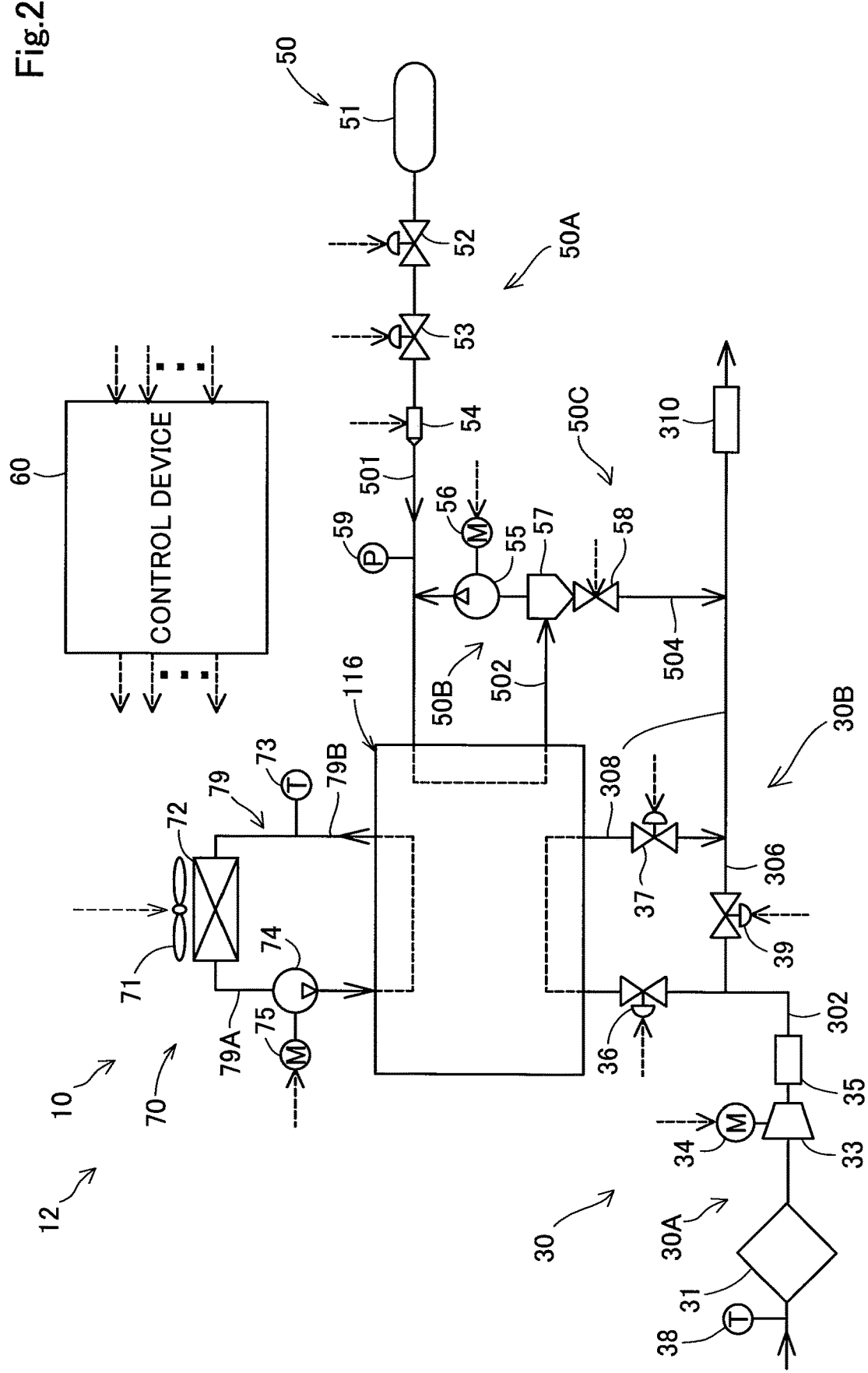
FIG. 2 shows a diagram illustrating a detailed configuration of the fuel cell system.

FIG. 2 shows a diagram illustrating the detailed configuration of the fuel cell system 10. The arrows shown in FIG. 2 indicate the supply and discharge directions of the fuel gas, the oxidizing gas, and the cooling medium, to and from the fuel cell stack 116. The fuel cell system 10 has a control device 60, in addition to the above-described components including the fuel cell stack 116, the oxidizing gas supply/discharge system 30, the fuel gas supply/discharge system 50, and the cooling medium circulation system 70. The control device 60 controls the operation of the fuel cell system 10. The control device 60 will be detailed later.

The oxidizing gas supply/discharge system 30 includes an oxidizing gas supply system 30A and an oxidizing gas discharge system 30B. The oxidizing gas supply system 30A supplies the oxidizing gas to the cathode of the fuel cell stack 116. The oxidizing gas supply system 30A has an oxidizing gas supply path 302, an outside air temperature sensor 38, an air cleaner 31, a compressor 33, a motor 34, an intercooler 35, and a first pressure regulating valve 36.

The oxidizing gas supply path 302 is a pipe which is disposed on the upstream side of the fuel cell stack 116 and connects the outside and the cathode of the fuel cell stack 116. The outside air temperature sensor 38 measures the temperature of the air which is the oxidizing gas taken into the air cleaner 31, that is, the outside air temperature. The measurement result of the outside air temperature sensor 38 is transmitted to the control device 60. The air cleaner 31 is disposed further toward the upstream side than the compressor 33 on the oxidizing gas supply path 302, and removes foreign substances from the oxidizing gas to be supplied to the fuel cell stack 116. The compressor 33 is disposed further toward the oxidizing gas supply path 302 on the upstream side than the fuel cell stack 116, and sends compressed air toward the cathode in response to the instruction given by the control device 60. The compressor 33 is driven by the motor 34 which operates in response to the instruction given by the control device 60. The intercooler 35 is disposed further toward the downstream side than the compressor 33 on the oxidizing gas supply path 302. The intercooler 35 cools the oxidizing gas which is compressed by the compressor 33 and becomes hot. The first pressure regulating valve 36 is a solenoid valve or a motor operated valve. The first pressure regulating valve 36 is controlled in its opening by the control device 60, and thereby regulates the flow rate of the oxidizing gas flowing from the oxidizing gas supply path 302 to the fuel cell stack 116.

The oxidizing gas discharge system 30B discharges the oxidizing gas which has flowed through the cathode to the outside. The oxidizing gas discharge system 30B has an oxidizing gas discharge path 308, a bypass path 306, a second pressure regulating valve 37, and a third pressure regulating valve 39. The oxidizing gas discharge path 308 is a pipe for discharging, to the outside, the oxidizing gas discharged from the cathode of the fuel cell stack 116 (also referred to as "oxidizing off-gas") and the oxidizing gas which has flowed through the bypass path 306. The second pressure regulating valve 37 is a solenoid valve or a motor operated valve. The second pressure regulating valve 37 is controlled in its opening by the control device 60, and thereby regulates the back pressure of the flow path in the cathode side of the fuel cell stack 116. The second pressure regulating valve 37 is disposed further toward the upstream side than the point where the oxidizing gas discharge path 308 is connected on the bypass path 306. A muffler 310 is disposed at the downstream end of the oxidizing gas discharge path 308.

The third pressure regulating valve 39 is disposed on the bypass path 306. The third pressure regulating valve 39 is a solenoid valve or a motor operated valve. The third pressure regulating valve 39 is controlled in its opening by the control device 60, and thereby regulates the flow rate of the oxidizing gas flowing through the bypass path 306. The bypass path 306 is a pipe connecting the oxidizing gas supply path 302 and the oxidizing gas discharge path 308, without going through the fuel cell stack 116.

The fuel gas supply/discharge system 50 includes a fuel gas supply system 50A, a fuel gas circulation system 50B, and a fuel gas discharge system 50C.

The fuel gas supply system 50A supplies the fuel gas to the anode of the fuel cell stack 116. The fuel gas supply system 50A includes a fuel gas tank 51, a fuel gas supply path 501, an opening/closing valve 52, a regulator 53, an injector 54, and a pressure sensor 59. The fuel gas tank 51 stores, for example, high-pressure hydrogen gas. The fuel gas supply path 501 is a pipe which is connected to the fuel gas tank 51 and the fuel cell stack 116 and allows fuel gas to circulate from the fuel gas tank 51 toward the fuel cell stack 116. The opening/closing valve 52 in an open state allows the fuel gas stored in the fuel gas tank 51 to flow downstream. The regulator 53 is controlled by the control device 60, and thereby regulates the pressure of the fuel gas which is further toward the upstream side than the injector 54. The injector 54 is disposed further toward the upstream side than the joining point of the fuel gas circulation path 502 (to be described later) on the fuel gas supply path 501.

The injector 54 is an opening/closing valve which is electromagnetically driven at the driving cycle or the opening time set by a control unit 62, and regulates the fuel gas supply amount to be supplied to the fuel cell stack 116. The pressure sensor 59 measures the internal pressure (the supply pressure of the fuel gas) which is further toward the downstream side than the injector 54 on the fuel gas supply path 501. The measurement result is transmitted to the control device 60.

The fuel gas circulation system 50B re-circulates the fuel gas discharged by the fuel cell stack 116 (also referred to as "fuel off-gas"), into the fuel gas supply path 501. The fuel gas circulation system 50B has a fuel gas circulation path 502, a gas/liquid separator 57, a circulation pump 55, and a motor 56. The fuel gas circulation path 502 is a pipe which is connected to the fuel cell stack 116 and the fuel gas supply path 501 and allows the fuel off-gas to flow toward the fuel gas supply path 501. The gas/liquid separator 57 is disposed on the fuel gas circulation path 502, and separates liquid water from the fuel off-gas mixed with the liquid water. The circulation pump 55 circulates the fuel off-gas existing in the fuel gas circulation path 502 toward the fuel gas supply path 501 by the driving of the motor 56.

The fuel gas discharge system 50C discharges the fuel off-gas and the liquid water generated by the power generation of the fuel cell stack 116 to the outside. The fuel gas discharge system 50C has a gas/water discharge path 504 and a gas/water discharge valve 58. The gas/water discharge path 504 is a pipe which is connected to the outside and the outlet of the gas/liquid separator 57 configured to discharge the liquid water.

The gas/water discharge valve 58 is disposed on the gas/water discharge path 504, and opens and closes the gas/water discharge path 504. The gas/water discharge valve 58 is, for example, a diaphragm valve. In the normal operation of the fuel cell system 10, the control device 60 gives an instruction to open the valve to the gas/water discharge valve 58 at a predetermined timing.

The cooling medium circulation system 70 includes a cooling medium circulation path 79, a cooling medium circulation pump 74, a motor 75, a radiator 72, a radiator fan 71, and a stack temperature sensor 73.

The cooling medium circulation path 79 has a cooling medium supply path 79A, a cooling medium discharge path 79B, and an internal flow path 79C. The cooling medium circulation path 79 allows the cooling medium to circulate into the fuel cell stack 116. The cooling medium supply path 79A is a pipe for supplying the cooling medium to the fuel cell stack 116. The cooling medium discharge path 79B is a pipe for discharging the cooling medium from the fuel cell stack 116. The internal flow path 79C is a flow path configured with the manifold Mfb (FIG. 1) and the like, so as to allow the cooling medium to circulate in the fuel cell stack 116. The cooling medium circulation pump 74 sends the cooling medium flowing through the cooling medium supply path 79A to the fuel cell stack 116 by the driving of the motor 75. The cooling medium circulation pump 74 is disposed on the cooling medium circulation path 79 and regulates the circulation flow rate of the cooling medium. The radiator 72 radiates heat by use of the wind sent by the radiator fan 71, and thereby cools the cooling medium flowing inside.

The stack temperature sensor 73 is disposed in the vicinity of the fuel cell stack 116 on the cooling medium discharge path 79B, and measures the temperature of the cooling medium in the cooling medium discharge path 79B, that is, the temperature of the cooling medium discharged by the fuel cell stack 116 (cooling medium temperature). The measurement result of the cooling medium temperature is transmitted to the control device 60. The control device 60 uses the measurement result of the stack temperature sensor 73 to acquire the temperature of the fuel cell stack 116. The control device 60 uses the acquired temperature of the fuel cell stack 116 in controlling the operation of the fuel cell system 10. Note that the cooling medium circulation system 70 may include a heater for heating the cooling medium. In cases where the control unit 62 uses the temperature measured by the stack temperature sensor 73 as the outside air temperature as well, the outside air temperature sensor 38 need not be included.

Figure 3:
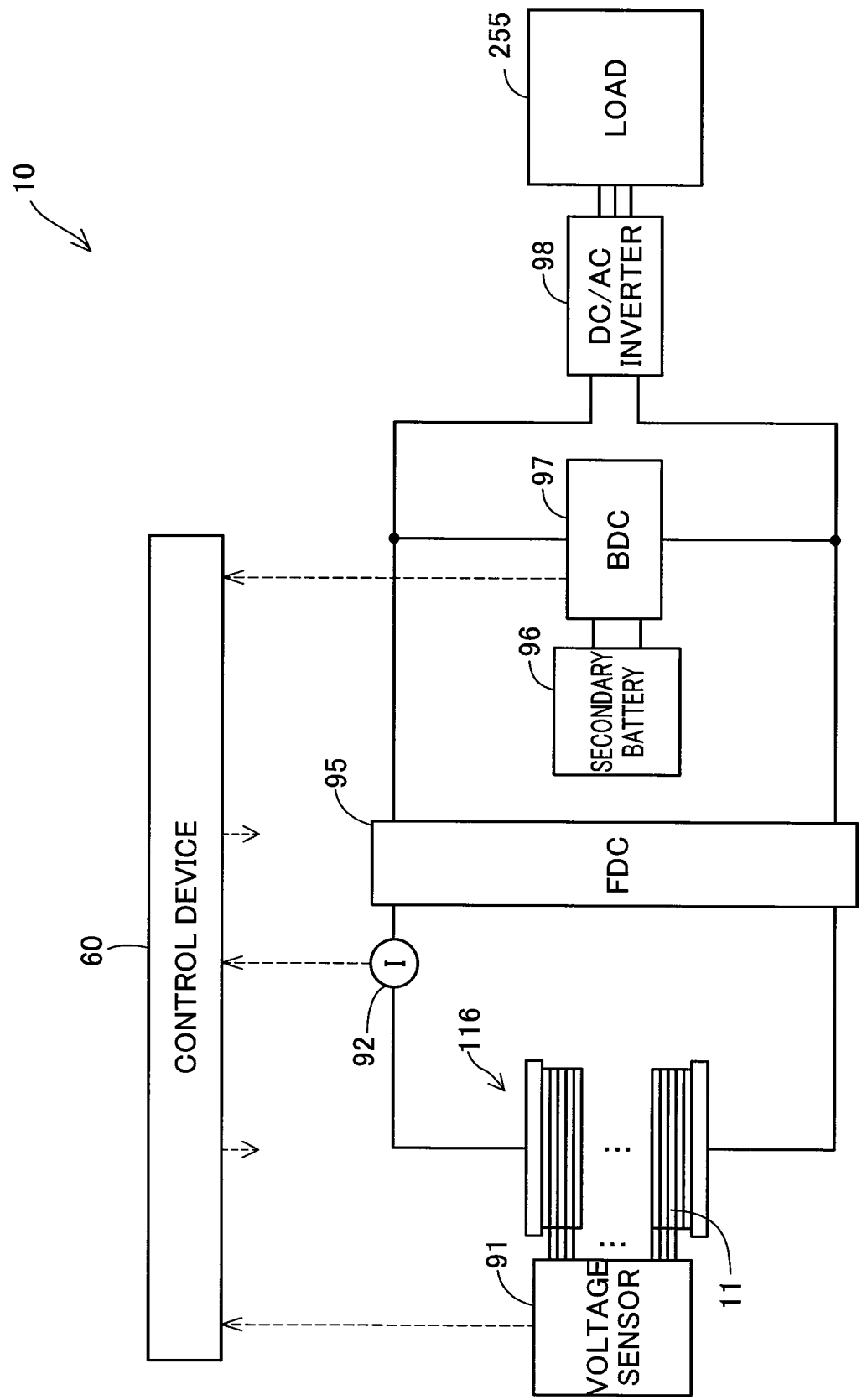
FIG. 3 shows a conceptual diagram representing an electrical configuration of the fuel cell system.

FIG. 3 shows a conceptual diagram representing the electrical configuration of the fuel cell system 10. The fuel cell system 10 includes an FDC 95, a DC/AC inverter 98, a voltage sensor 91, and a current sensor 92.

The voltage sensor 91 is used to measure the voltage of the fuel cell stack 116. The voltage sensor 91 is connected to the fuel cells 11 of the fuel cell stack 116 respectively, and measures the voltages of the respective fuel cells 11. The voltage sensor 91 transmits the measurement results to the control device 60. All of the results of the voltages of the fuel cells 11 measured by the voltage sensor 91 are added up, so that the total voltage of the fuel cell stack 116 is acquired. Note that the fuel cell system 10 may have, instead of the voltage sensor 91, a voltage sensor configured to measure the voltage of both ends of the fuel cell stack 116. In this case, the measured voltage of both ends corresponds to the total voltage of the fuel cell stack 116. The current sensor 92 measures the current value output by the fuel cell stack 116 and transmits the measurement result to the control device 60.

The FDC 95 is a circuit configured as a DC/DC converter. The FDC 95 controls the voltage to be output by the fuel cell stack 116 on the basis of the voltage command value transmitted by the control device 60. The FDC 95 further controls the current to be output by the fuel cell stack 116 on the basis of the current command value transmitted by the control device 60. The current command value is the target value of the current to be output by the fuel cell stack 116 and is set by the control device 60. In an example, the control device 60 generates a current command value by calculating a required current value by use of a required power generation level of the fuel cell stack 116.

The DC/AC inverter 98 is connected to the fuel cell stack 116 and a load 255 such as a drive motor. The DC/AC inverter 98 converts the DC power output by the fuel cell stack 116 to an AC power and supplies the AC power to the load 255.

The fuel cell system 10 further includes a secondary battery 96 and a BDC 97. The secondary battery 96 is configured with, for example, a lithium ion battery, and functions as an auxiliary power source. The secondary battery 96 supplies power to the load 255 and is charged with the power generated by the fuel cell stack 116 and regenerative power. In other words, the secondary battery 96 is used for the charging and discharging of the power generated by the fuel cell stack 116.

The BDC 97 is a circuit configured as a DC/DC converter along with the FDC 95, and controls the charging and discharging of the secondary battery 96 in response to the instruction given by the control device 60 functioning as a control unit. The BDC 97 measures the SOC (state of charge: residual capacity) of the secondary battery 96, and transmits the measurement result to the control device 60.

Figure 4:
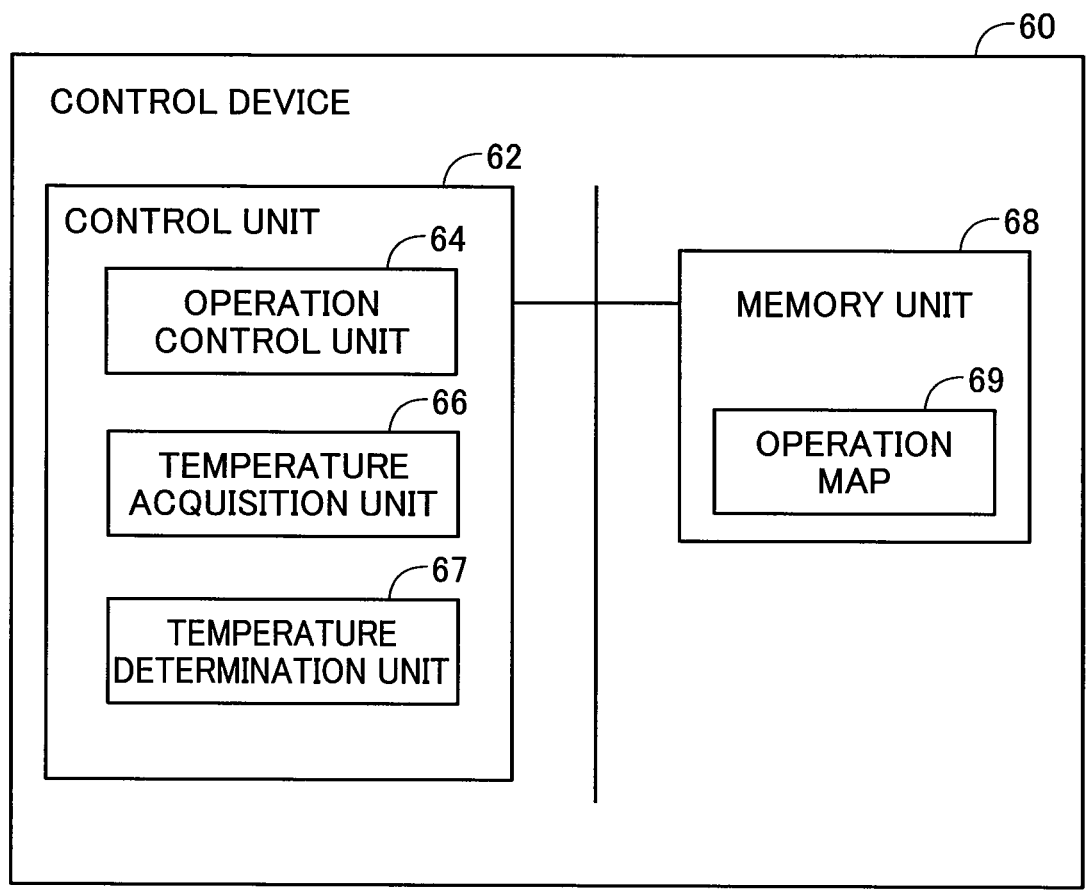
FIG. 4 shows a block diagram representing an inside of a control device.

FIG. 4 shows a block diagram representing the inside of the control device 60. The control device 60 has a memory unit 68 configured with a RAM and a ROM, and a control unit 62. The control unit 62 controls the operation of the cooling medium circulation pump 74 by using the temperature acquired by use of the measurement result of the stack temperature sensor 73 (acquisition temperature).

The memory unit 68 stores an operation map 69 for use in controlling the operation of the cooling medium circulation pump 74. The operation map 69 will be detailed later. The memory unit 68 further stores various types of programs to be executed by the control unit 62. The control unit 62 functions as an operation control unit 64, a temperature acquisition unit 66, and a temperature determination unit 67, by executing the various types of programs stored in the memory unit 68. In an example, the operation control unit 64 controls the operation of the fuel cell system 10 on the basis of the contents determined by the temperature determination unit 67. The temperature acquisition unit 66 acquires the temperature of the fuel cell stack 116, by using the measurement result of the stack temperature sensor 73. In the present embodiment, the temperature acquisition unit 66 acquires the measurement result of the stack temperature sensor 73 as the temperature of the fuel cell stack 116. The acquired temperature is also used as the temperature of the cooling medium on the cooling medium circulation path 79. The stack temperature sensor 73 and the temperature acquisition unit 66 in the present embodiment correspond to the "stack temperature acquisition unit" described in the Summary section. Note that, in another embodiment, the temperature acquisition unit 66 need not include the stack temperature sensor 73. In this case, the temperature acquisition unit 66 may acquire the acquisition temperature by estimating the temperature by use of another parameter correlated with the temperature of the fuel cell stack 116.

The temperature determination unit 67 functions in cases where warm-up operation for rapidly raising the temperature of the fuel cell stack 116 by a low efficiency operation is executed when the fuel cell system 10 starts up in response to the turning-on of a start switch of the fuel cell system 10. The temperature determination unit 67 executes determination regarding a change in the temperature of the cooling medium during the warm-up operation of the fuel cell stack 116. Specifically, the temperature determination unit 67 determines whether or not the change in the acquisition temperature corresponding to the temperature measured by the stack temperature sensor 73 turns from upward to downward or whether or not the change in the acquisition temperature turns from downward to upward after warm-up operation processing is started and the cooling medium circulation pump 74 is driven.

The warm-up operation processing is executed in cases where a predetermined condition with respect to temperature is satisfied. In an example, the predetermined condition is that the value measured by the outside air temperature sensor 38 is equal to or lower than a predetermined temperature, for example, below freezing point. The warm-up operation corresponds to an operation state in which the temperature of the fuel cell stack 116 is raised by use of the heat generated by the fuel cell stack 116, so as to reach a predetermined target temperature Tg (e.g., 65° C.) in a steady state. The stoichiometric ratio of the oxidizing gas supplied to the fuel cell stack 116 in the warm-up operation is set to lower than the stoichiometric ratio in the steady state, and the increase of the oxygen concentration overvoltage results in the increase of the loss of power generation of the fuel cell stack 116. The stoichiometric ratio of the oxidizing gas means the ratio of the actual supplied amount of oxygen with respect to the minimum amount of oxygen required to generate a required power generation level. In the present embodiment, the stoichiometric ratio of the oxidizing gas in the warm-up operation is approx. 1.0.

FIG. 5 shows a diagram illustrating the operation map 69. The operation map 69 includes the cooling medium temperature, the rotational speed of the cooling medium circulation pump 74 according to the cooling medium temperature, the rising rate Rr, and the drop rate Dr. The cooling medium temperature is the acquisition temperature. Each the rising rate Rr and the drop rate Dr means the time until the rotational speed reaches a predetermined proportion (e.g., 90%) with respect to the operation command value [rpm] relating to the cooling medium circulation pump 74. Once the value of the rising rate Rr is set, increase speed is controlled at a constant value according to the value of the rising rate Rr. Once the value of the drop rate Dr is set, decrease speed is controlled at a constant value according to the value of the drop rate Dr. In other words, the lower the rising rate Rr is, the higher the increase speed of the rotational speed is. The higher the rising rate Rr is, the lower the increase speed of the rotational speed is. Moreover, the lower the drop rate Dr is, the higher the decrease speed of the rotational speed is. The higher the drop rate Dr is, the lower the decrease speed of the rotational speed is. In the operation map 69 of the present embodiment, the rising rate Rr is set to a constant value Ra1, and the drop rate Dr is set to a constant value Rb1. In an example, the rotational speed is set to a higher value as the cooling medium temperature becomes higher. Note that the operation map 69 may be defined according to a circulation flow rate on the cooling medium circulation path 79, instead of a rotational speed. In this case, the rotational speed of the cooling medium circulation pump 74 is controlled so as to reach the circulation flow rate specified according to the cooling medium temperature.

Figure 6:
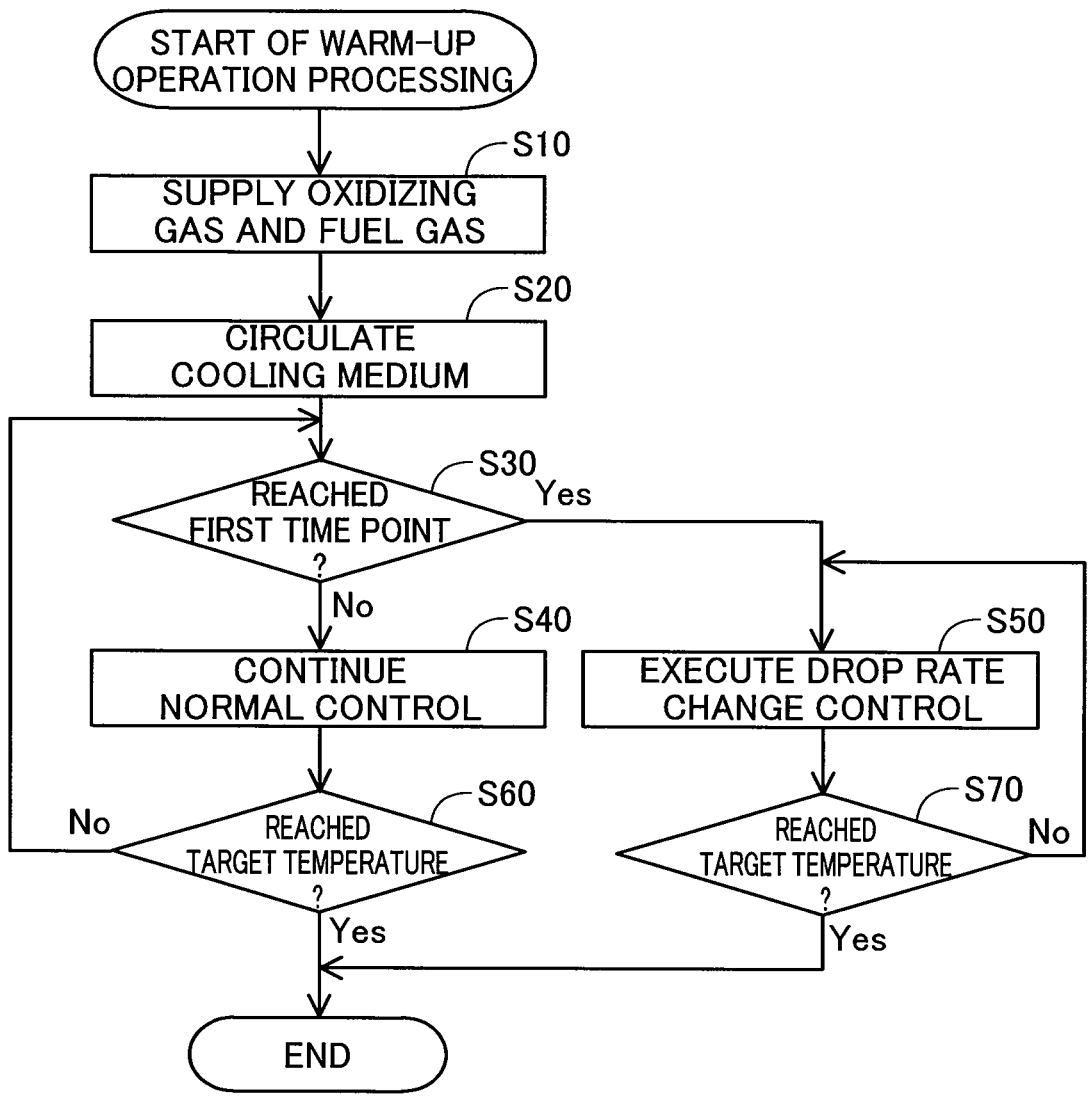
FIG. 6 shows a flowchart of the warm-up operation processing to be executed by a control unit.
Figure 7:
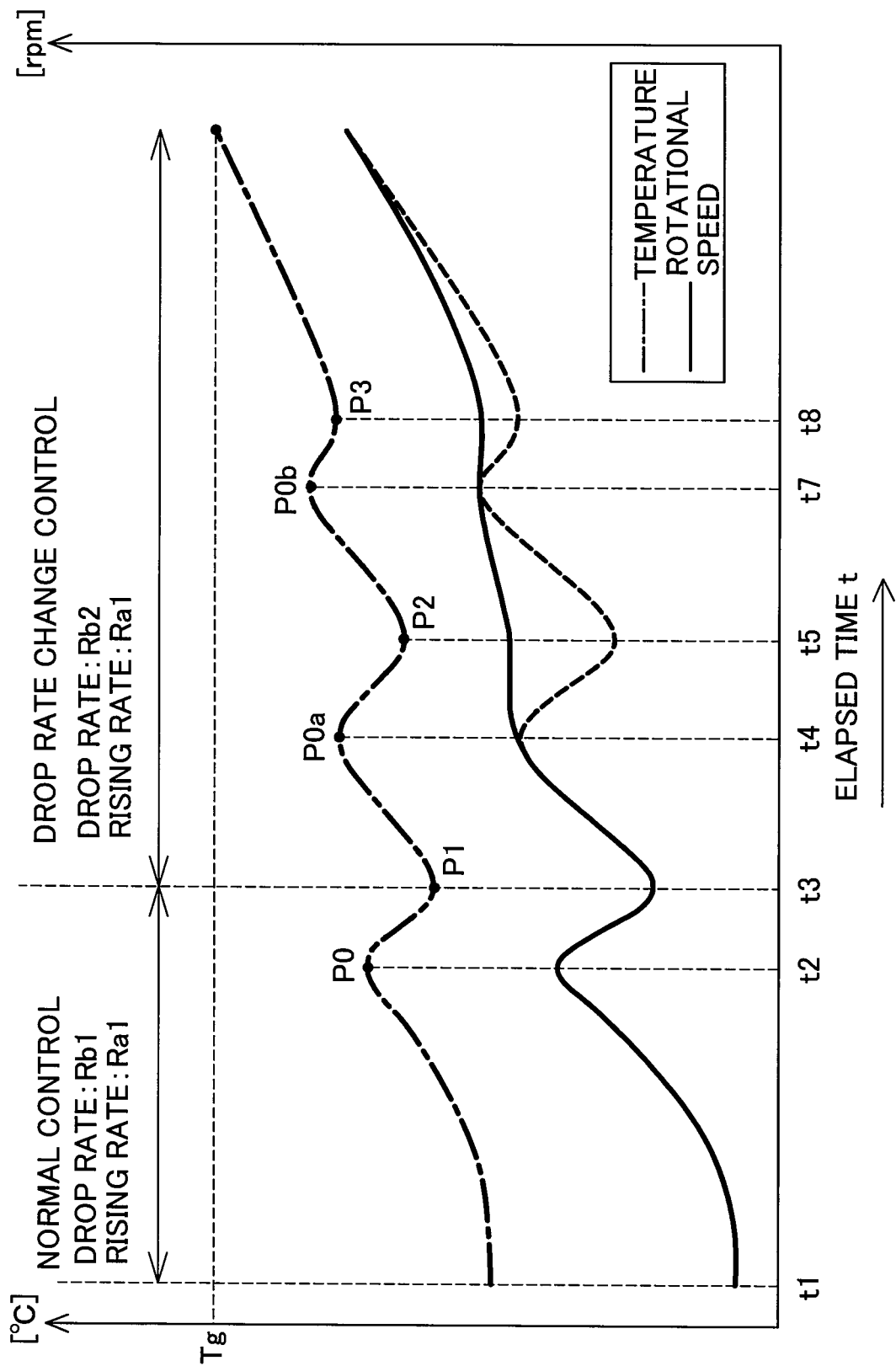
FIG. 7 shows a diagram representing the relationship between acquisition temperature and rotational speed in the warm-up operation processing.

FIG. 6 shows a flowchart of the warm-up operation processing to be executed by the control unit 62. FIG. 7 shows a diagram representing the relationship between acquisition temperature and rotational speed in the warm-up operation processing. The dotted curve in FIG. 7 represents rotational speed in a case where normal control is executed without the execution of drop rate change control.

The warm-up operation processing is executed in cases where a predetermined condition is satisfied when the fuel cell system 10 starts up in response to the turning-on of the start switch of the fuel cell system 10. In the present embodiment, the predetermined condition is that the temperature measured by the outside air temperature sensor 38 is equal to or lower than a predetermined temperature (e.g., freezing point). In another embodiment, the predetermined temperature may be below freezing point, for example, −20° C. or −30° C. The warm-up operation processing is finished when the temperature of the fuel cell stack 116 (in the present embodiment, the temperature measured by the stack temperature sensor 73) reaches the predetermined target temperature Tg (e.g., 65° C.).

As shown in FIG. 6, in the warm-up operation processing, the control unit 62 drives the oxidizing gas supply/discharge system 30 and the fuel gas supply/discharge system 50 to supply the oxidizing gas and the fuel gas to the fuel cell stack 116, and thereby makes the fuel cell stack 116 generate power by a low efficiency operation (warm-up operation) (step S10). The control unit 62 drives the cooling medium circulation system 70, and thereby circulates the cooling medium into the fuel cell stack 116 (step S20). In step S20, the control unit 62 executes normal control to control the rotational speed of the cooling medium circulation pump 74, by driving the cooling medium circulation pump 74 on the basis of the operation map 69 and the acquisition temperature acquired at a predetermined interval. Note that the execution order of step S10 and step S20 is not limited to the one in the present embodiment, and the steps may be executed in reverse order or simultaneously.

In the next step after step S20, the temperature determination unit 67 determines whether or not the change in the acquisition temperature has reached a first time point P1 (step S30). The first time point P1 is the time point where, after the change in the acquisition temperature turns from upward to downward for the first time after the start of the warm-up operation processing, the change in the acquisition temperature turns from downward to upward. Note that in determining whether or not the change has reached the first time point P1, the temperature determination unit 67 shall preferably acquire the acquisition temperature from the temperature acquisition unit 66 at such a sampling cycle that the acquisition temperature does not fluctuate minutely, that is, the change in the acquisition temperature does not temporarily turn from upward to downward, or from downward to upward. This enables the improvement of accuracy in the determination by the temperature determination unit 67. As will be described later, the temperature determination unit 67 may carry out polynomial approximation using the least-squares method on the plots of a plurality of acquisition temperatures aligned in time series as a function, to determine whether or not the change has reached the first time point P1, on the basis of the function.

The steps from step S10 to step S30 are described by referring to FIG. 7. As shown in FIG. 7, the warm-up operation processing is started at a time t1, and the cooling medium existing in the fuel cell stack 116 is warmed as the fuel cell stack 116 is raised in temperature by the generated heat. The acquisition temperature is raised as the warmed cooling medium flows out into the cooling medium discharge path 79B by the operation of the cooling medium circulation pump 74. In cases where the temperature of the cooling medium herein is low (e.g., below −30° C.), the viscosity of the cooling medium is higher than that at normal temperature. This suppresses the cooling medium from being mixed on the cooling medium circulation path 79, and thus the temperature distribution of the cooling medium in the cooling medium circulation path 79 increases. Specifically, the temperature of the cooling medium existing on the internal flow path 79C is raised by the heat generated by the fuel cell stack 116, while the temperature of the cooling medium existing on the cooling medium supply path 79A remains low. Therefore, when the un-warmed cooling medium on the cooling medium supply path 79A is introduced into the fuel cell stack 116, the temperature of the fuel cell stack 116 drops. As the temperature drops, the cooling medium in the internal flow path 79C is suppressed from being raised in temperature to above the temperature of the cooling medium initially existing on the internal flow path 79C (initial cooling medium) at the start of the warm-up operation, and is made to flow out into the cooling medium discharge path 79B. As a result, the acquisition temperature, which is the measurement result of the stack temperature sensor 73, drops (in the period from the time t2 to the time t3 in FIG. 7).

On the other hand, when the warmed initial cooling medium is circulated and again introduced from the cooling medium supply path 79A into the fuel cell stack 116, the initial cooling medium is again raised in temperature by the heat generated by the fuel cell stack 116. When the re-warmed initial cooling medium is made to flow out into the cooling medium discharge path 79B, the acquisition temperature is raised again (in the period from the time t3 to a time t4). In other words, the change in the acquisition temperature turns from downward to upward at the time t3. That is, at the time t3, the change in the acquisition temperature reaches the first time point P1. In other words, in the graph with time on the horizontal axis and temperature on the vertical axis, the inclination of the line representing the acquisition temperature turns, at the first time point P1, from negative to positive after the time t2 at which the inclination of the line turns from positive to negative for the first time. It Note that the line representing the acquisition temperature may be calculated as a function by the execution of polynomial approximation using the least-squares method on the plots of the plurality of acquisition temperatures aligned in time series.

As shown in FIG. 6, in cases where the change in the acquisition temperature does not reach the first time point P1, the operation control unit 64 continues the normal control of the cooling medium circulation pump 74 on the basis of the operation map 69 (step S40). That is, the operation control unit 64 generates an operation command value by referring to the operation map 69, and controls the operation of the cooling medium circulation pump 74 by using the value Ra1 set as the rising rate Rr and the value Rb1 set as the drop rate Dr so as to obtain the operation command value. The operation control unit 64 determines whether or not the acquisition temperature has reached the target temperature Tg (step S60). In cases where the acquisition temperature has reached the target temperature Tg, the control unit 62 finishes the warm-up operation processing. In cases where the acquisition temperature has not reached the target temperature Tg, the processing of step S30 is re-executed. Note that the processing of step 60 may be executed at each step, and is not limited to execution after step S40.

In cases where the change in the acquisition temperature has reached the first time point P1, the operation control unit 64 controls the operation of the cooling medium circulation pump 74 by the drop rate change control instead of the normal control (step S50). In the drop rate change control, the drop rate Dr is set to a value Rb2 larger than the value Rb1 set before the first time point P1. In other words, in the drop rate change control, the decrease speed in cases of decreasing the rotational speed of the cooling medium circulation pump 74 is set to a value smaller than the value set before the first time point P1. In the drop rate change control, control contents other than the drop rate Dr are executed on the basis of the contents specified in the operation map 69. In the present embodiment, the value Rb2 is set to an infinite value. That is, the control unit 62 sets the decrease speed of the rotational speed to zero, to set the decrease speed to a smaller value than the value set before the first time point P1. That is, in the drop rate change control, the rotational speed is maintained without being decreased from the present value even in cases where the generated operation command value is smaller than the present operation command value (rotational speed). The operation control unit 64 determines whether or not the acquisition temperature has reached the target temperature Tg (step S70). In cases where the acquisition temperature has reached the target temperature Tg, the control unit 62 finishes the warm-up operation processing. In cases where the acquisition temperature has not reached the target temperature Tg, the processing of step S50 is re-executed.

As shown in FIG. 7, in the period from a time point P0a at the time t4 when the change in the acquisition temperature turns from upward to downward for the second time, to a time point P2 at a time t5 when the change in the acquisition temperature turns from downward to upward for the second time, although the operation command value generated on the basis of the operation map 69 is gradually decreased, the rotational speed is maintained without being decreased because the drop rate Dr is set to an infinite value. Similarly, in the period from a time point P0b at a time t7 when the change in the acquisition temperature turns from upward to downward for the third time, to a time point P3 at a time t8 when the change in the acquisition temperature turns from downward to upward for the third time, although the operation command value generated on the basis of the operation map 69 is gradually decreased, the rotational speed is maintained without being decreased because the drop rate Dr is set to an infinite value.

According to the first embodiment described above, after the start of the warm-up operation processing, the control unit 62 sets, after the first time point P1, the decrease speed for decreasing the rotational speed of the cooling medium circulation pump 74 to a value smaller than the value set before the first time point P1. This, in the present embodiment, enables the suppression of a significant change in the flow rate of the cooling medium flowing into the fuel cell stack 116. Therefore, the present embodiment enables the suppression of a significant drop in the temperature of the fuel cell stack 116 due to the cooling medium, thus reducing the possibility of the freezing of the water generated in the fuel cell stack 116. This, in the present embodiment, enables the suppression of any hinderance in the supply of the oxidizing gas to the cathode, thus enabling the suppression of the generation of the pumping hydrogen. The generation of the pumping hydrogen is suppressed, thereby reducing the concentration of the hydrogen to be discharged from the oxidizing gas discharge path 308 to the outside.

Especially after the first time point P1, the control unit 62 sets the drop rate Dr to an infinite value, to set the decrease speed to zero. This, in the present embodiment, enables furtherer suppression of a significant fluctuation in the flow rate of the cooling medium flowing into the fuel cell stack 116, thereby enabling further reduction of the possibility of the freezing of the water generated in the fuel cell stack 116. This further suppresses the generation of the pumping hydrogen.

In cases where the change has reached the first time point P1 after the start of the warm-up operation processing, it is estimated that the cooling medium existing in the fuel cell stack 116 at the start of the warm-up operation processing has passed through the cooling medium discharge path 79B and the cooling medium supply path 79A, and has flowed into the fuel cell stack 116 again. That is, the cooling medium warmed by the heat generated by the fuel cell stack 116 has been circulated on the cooling medium circulation path 79, and thereby the entire cooling medium in the cooling medium circulation path 79 has been warmed up to a certain temperature or higher. This enables circulation of cooling medium with a viscosity lower than that at the start of the warm-up operation processing after the first time point P1 by use of the cooling medium circulation pump 74. As a result, the actual flow rate of the cooling medium is prevented from significantly fluctuating with respect to the target flow rate of the cooling medium according to the rotational speed.

B. Second Embodiment

Figure 8:
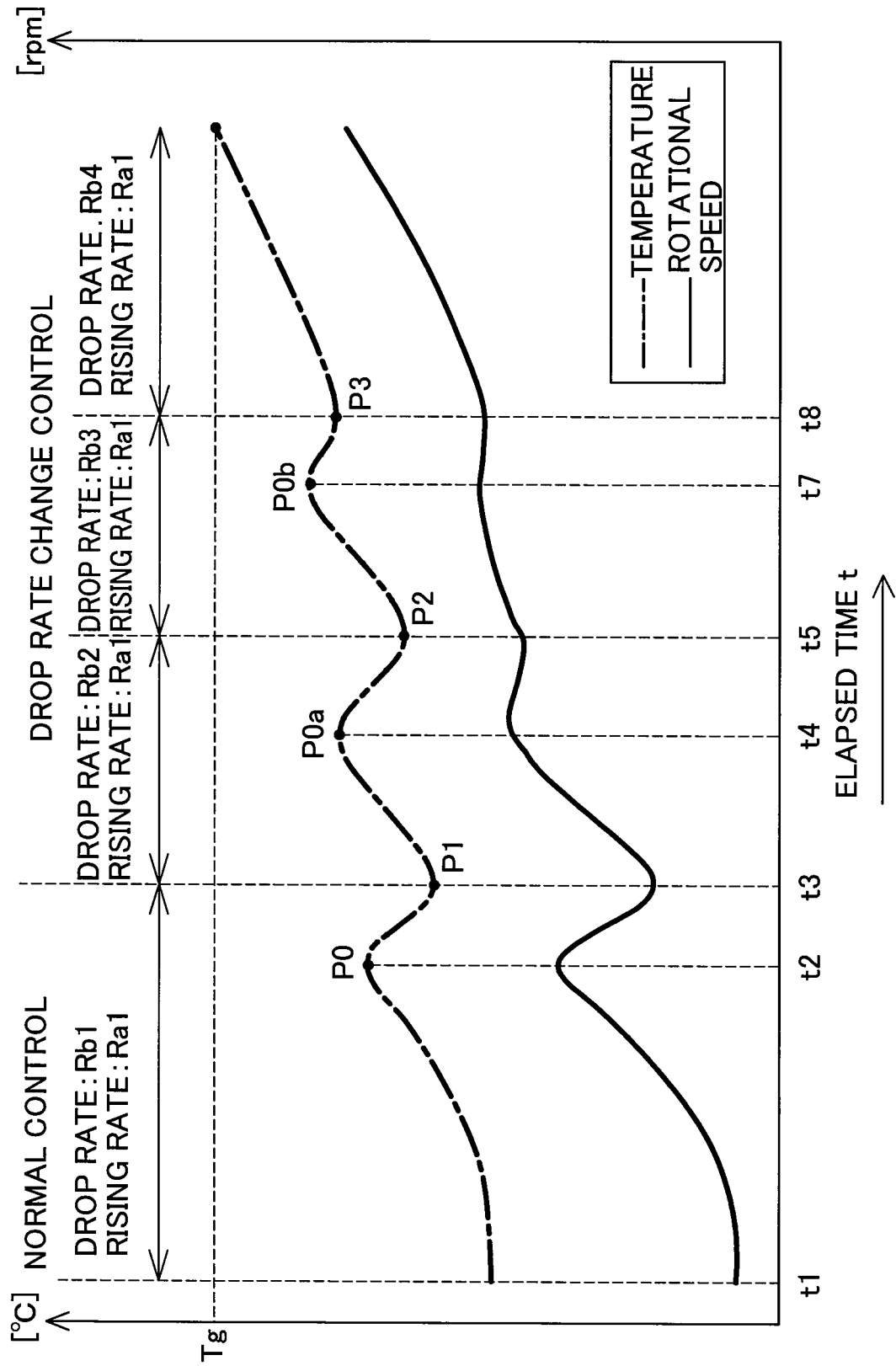
FIG. 8 shows a diagram representing the relationship between acquisition temperature and rotational speed in the warm-up operation processing of a second embodiment.

FIG. 8 shows a diagram representing the relationship between acquisition temperature and rotational speed in the warm-up operation processing of the second embodiment. The warm-up operation processing of the second embodiment differs from the warm-up operation processing of the first embodiment in the contents of its drop rate change processing. The configuration of the fuel cell system 10 and the other contents of the warm-up operation processing are the same as those of the first embodiment, and thus the descriptions of the same configuration and processing are omitted as appropriate.

In the drop rate change processing to be executed by the control unit 62 of the second embodiment, the drop rate Dr is set to a larger value gradually each time the change in the acquisition temperature reaches predetermined time points P1, P2, P3. That is, each time the change in the acquisition temperature reaches the predetermined time points P1, P2, P3, the decrease speed in cases of decreasing the rotational speed is set to a smaller value gradually. The predetermined time points P1, P2, P3 are the time points each at which the change in the acquisition temperature turns from downward to upward after turning from upward to downward.

As shown in FIG. 8, the control unit 62 controls the operation of the cooling medium circulation pump 74 by the normal control before the first time point P1. After the first time point P1, the control unit 62 sets the drop rate Dr to the value Rb2 which is larger than the value Rb1 in the normal control, as with the case of the first embodiment described above. After the second time point P2 at which the change in the acquisition temperature turns from downward to upward, after the time point P0a at which the change in the acquisition temperature turns from upward to downward for the first time after the first time point P1, the control unit 62 sets the drop rate Dr to a value Rb3 which is larger than the value Rb2 set in the period from the first time point P1 until before the second time point P2. That is, in cases of decreasing the rotational speed of the cooling medium circulation pump 74 after the second time point P2, the control unit 62 sets the decrease speed to a value smaller than the value of the decrease speed set in the period from the first time point P1 until before the second time point P2. After the third time point P3 at which the change in the acquisition temperature turns from downward to upward, after the time point P0b at which the change in the acquisition temperature turns from upward to downward for the first time after the second time point P2, the control unit 62 sets the drop rate Dr to a value Rb4 which is larger than the value Rb3. That is, in cases of decreasing the rotational speed of the cooling medium circulation pump 74 after the third time point P3, the control unit 62 sets the decrease speed to a value smaller than the value set in the period from the second time point P2 until before the third time point P3.

The second embodiment described above exerts the same effects with respect to the same configuration and processing contents as those of the first embodiment. In an example, after the start of the warm-up operation processing, the control unit 62 sets, after the first time point P1, the decrease speed in cases of decreasing the rotational speed of the cooling medium circulation pump 74 to a value smaller than the value set before the first time point P1. This enables the suppression of a significant drop in the temperature of the fuel cell stack 116 due to the cooling medium, thereby enabling the reduction of the possibility of the freezing of the water generated in the fuel cell stack 116. Moreover, according to the second embodiment described above, the control unit 62 sets the decrease speed to a smaller value gradually for each of the predetermined time points P1 P2, P3, thereby enabling the suppression of significant fluctuations in the temperature of the cooling medium flowing into the fuel cell stack 116. This enables further reduction of the possibility of the freezing of the water generated in the fuel cell stack 116, thereby enabling further suppression of the generation of the pumping hydrogen.

C. Other Embodiments

C-1. First Other Embodiment

Although in the first embodiment described above the control unit 62 sets the drop rate Dr to an infinite value in the drop rate change control, the drop rate Dr is not limited thereto. In an example, the control unit 62 may set the drop rate Dr to a value larger than the value Rb1 of the case of the normal control (e.g., five or ten times the value Rb1), in the drop rate change control.

C-2. Second Other Embodiment

In each of the embodiments described above the fuel cell system 10 supplies and discharges the fuel gas, the oxidizing gas, and the cooling medium from only one end side of the fuel cell stack 116. However, the configuration is not limited thereto. In an example, the fuel cell system 10 may be configured to supply the fuel gas, the oxidizing gas and the cooling medium from one end side of the fuel cell stack 116, and to discharge the fuel gas, the oxidizing gas and the cooling medium from the other end side.

The present disclosure is not limited to the above-described embodiments, and is realizable in various types of configurations without deviating from its purpose. In an example, the technical features of the embodiments corresponding to the technical features of the respective aspects described in the Summary section may be replaced or combined as appropriate in order to solve some or all of the above-described problems, or in order to achieve some or all of the above-described effects. Further, the technical features may be deleted as appropriate, unless they are described as essential in the present specifications. The present disclosure may be implemented by aspects described below.

(1) The present disclosure in one aspect provides a fuel cell system. The fuel cell system includes a fuel cell stack, a cooling medium circulation path allowing a cooling medium to flow into the fuel cell stack, a cooling medium circulation pump disposed on the cooling medium circulation path and configured to regulate the circulation flow rate of the cooling medium, a stack temperature acquisition unit configured to acquire the temperature of the fuel cell stack, and a control unit configured to control operation of the cooling medium circulation pump by use of an acquisition temperature acquired by the stack temperature acquisition unit. The control unit executes warm-up operation processing of the fuel cell stack to raise the temperature of the fuel cell stack by use of heat generated by the fuel cell stack when a predetermined condition is satisfied. The control unit drives the cooling medium circulation pump according to the acquisition temperature in the warm-up operation processing. After a first time point when a change in the acquisition temperature turns from downward to upward after the change in the acquisition temperature turns from upward to downward for the first time after the start of the warm-up operation processing, the control unit sets a decrease speed in cases of decreasing the rotational speed of the cooling medium circulation pump to a smaller value than a value set before the first time point.

The control unit according to the present aspect sets, after the first time point, the decrease speed to a smaller value than the value set before the first time point, thereby enabling the suppression of a significant fluctuation in the flow rate of the cooling medium flowing into the fuel cell stack. Accordingly, the temperature of the fuel cell stack is prevented from significantly dropping due to the cooling medium, thus enabling the reduction of the possibility of the freezing of the water generated in the fuel cell stack. This enables the suppression of any hinderance in the supply of oxidizing gas to the cathode, thus enabling the suppression of the generation of pumping hydrogen.

(2) The control unit according to the above-described aspect may set the decrease speed to zero to set the decrease speed to a smaller value than the value set before the first time point.

According to the present aspect, the flow rate of the cooling medium flowing into the fuel cell stack is further suppressed from fluctuating significantly, thus enabling the further reduction of the possibility of the freezing of the water generated in the fuel cell stack. This enables further suppression of the generation of the pumping hydrogen.

(3) According to the above-described aspect, after a second time point when the change in the acquisition temperature turns from downward to upward after the change in the acquisition temperature turns from upward to downward for the first time after the first time point, the control unit may set the decrease speed to a smaller value than a value set in a period from the first time point before the second time point.

According to the present aspect, after the second time point, the decrease speed in cases of decreasing the rotational speed is set to a smaller value than the value set in the period from the first time point before the second time point, thereby enabling the suppression of significant fluctuation in the temperature of the cooling medium flowing into the fuel cell stack. This enables the further reduction of the possibility of the freezing of the water generated in the fuel cell stack, thus enabling the further suppression of the generation of the pumping hydrogen.

The present disclosure is realizable in various aspects, not only the fuel cell system described above, but also, for example, a control method of the fuel cell system, a computer program for making a computer execute the control method, and a non-transitory storing medium storing the computer program.

What is claimed is:

1. A fuel cell system comprising:
   a fuel cell stack;
   a cooling medium circulation path allowing a cooling medium to circulate in the fuel cell stack;
   a cooling medium circulation pump disposed on the cooling medium circulation path, the cooling medium circulation pump configured to regulate a circulation flow rate of the cooling medium;
   a stack temperature acquisition unit configured to acquire a temperature of the fuel cell stack; and
   a control unit configured to control operation of the cooling medium circulation pump by use of an acquisition temperature acquired by the stack temperature acquisition unit, wherein
   the control unit
   executes warm-up operation processing of the fuel cell stack to raise the temperature of the fuel cell stack by use of heat generated by the fuel cell stack when a predetermined condition is satisfied,
   drives the cooling medium circulation pump according to the acquisition temperature in the warm-up operation processing, and after a first time point when a change in the acquisition temperature turns from downward to upward after the change in the acquisition temperature turns from upward to downward for a first time after the start of the warm-up operation processing, sets a decrease rate when a rotational speed of the cooling medium circulation pump is decreased, to a smaller value than a value set before the first time point.

2. The fuel cell system according to claim 1, wherein the control unit sets the decrease rate to zero, to set the decrease rate to a smaller value than the value set before the first time point.

3. The fuel cell system according to claim 1, wherein after a second time point when the change in the acquisition temperature turns from downward to upward after the change in the acquisition temperature turns from upward to downward for a first time after the first time point, the control unit sets the decrease rate to a smaller value than a value set in a period from the first time point until before the second time point.

* * * * *